(12) United States Patent
Wang et al.

(10) Patent No.: US 7,904,596 B1
(45) Date of Patent: Mar. 8, 2011

(54) METHOD AND SYSTEM FOR TRACKING SCREEN ACTIVITIES

(76) Inventors: Jinsheng Wang, Sunnyvale, CA (US); Joe Zheng, Cupertino, CA (US)

( * ) Notice: Subject to any disclaimer, the term of this patent is extended or adjusted under 35 U.S.C. 154(b) by 400 days.

(21) Appl. No.: 11/219,289

(22) Filed: Sep. 2, 2005

Related U.S. Application Data

(63) Continuation of application No. 10/731,227, filed on Dec. 8, 2003, now Pat. No. 7,299,281, which is a continuation of application No. 09/705,391, filed on Nov. 2, 2000, now Pat. No. 6,662,226, which is a continuation-in-part of application No. 09/492,559, filed on Jan. 27, 2000, now abandoned, and a continuation-in-part of application No. 09/644,404, filed on Aug. 23, 2000, now abandoned.

(51) Int. Cl.
G06F 15/16 (2006.01)
G06F 15/173 (2006.01)
G06K 9/18 (2006.01)
(52) U.S. Cl. .......... 709/246; 709/203; 709/224; 382/182
(58) Field of Classification Search .................. None
See application file for complete search history.

(56) References Cited

U.S. PATENT DOCUMENTS

| 4,264,808 | A | | 4/1981 | Owens et al. | |
|---|---|---|---|---|---|
| 5,195,133 | A | | 3/1993 | Kapp et al. | |
| 5,297,202 | A | * | 3/1994 | Kapp et al. | 705/75 |
| 5,388,252 | A | | 2/1995 | Dreste et al. | |
| 5,544,255 | A | | 8/1996 | Smithies et al. | |
| 5,579,407 | A | * | 11/1996 | Murez | 382/164 |
| 5,732,212 | A | | 3/1998 | Perholtz et al. | |
| 5,818,955 | A | | 10/1998 | Smithies et al. | |
| 6,091,835 | A | | 7/2000 | Smithies et al. | |
| 6,141,006 | A | | 10/2000 | Kowlton et al. | |
| 6,237,138 | B1 | * | 5/2001 | Hameluck et al. | 717/128 |
| 6,249,283 | B1 | | 6/2001 | Ur | |
| 6,253,238 | B1 | | 6/2001 | Lauder et al. | |
| 6,370,573 | B1 | | 4/2002 | Bowman-Amuah | |
| 6,381,344 | B1 | | 4/2002 | Smithies et al. | |
| 6,446,119 | B1 | | 9/2002 | Olah et al. | |
| 6,449,739 | B1 | | 9/2002 | Landan | |
| 6,510,461 | B1 | | 1/2003 | Nielsen | |
| 6,662,226 | B1 | | 12/2003 | Wang et al. | |
| 7,229,012 | B1 | | 6/2007 | Enright et al. | |
| 7,287,071 | B2 | * | 10/2007 | MacLean | 709/224 |
| 7,299,281 | B1 | | 11/2007 | Wang et al. | |
| 2006/0041591 | A1 | | 2/2006 | Rhoads | |

(Continued)

FOREIGN PATENT DOCUMENTS

WO WO 98/20405 5/1998
WO WO 99/13423 3/1999

OTHER PUBLICATIONS

NN9502377, IBM Technical Disclosure Bulletin, Feb. 1, 1995.*

(Continued)

*Primary Examiner* — Wen-Tai Lin
(74) *Attorney, Agent, or Firm* — Knobbe, Martens, Olson & Bear LLP

(57) ABSTRACT

Techniques to facilitate a system to capture, process, and archive a series of user interactive events and subsequently retrieve the stored user interactive events are disclosed. The captured information is indexed and stored for future access either on a terminal device or an accessible remote server device.

15 Claims, 14 Drawing Sheets

U.S. PATENT DOCUMENTS

2006/0248554 A1* 11/2006 Priddy ............................ 725/25
2007/0145138 A1* 6/2007 Snyder et al. ............ 235/462.01

OTHER PUBLICATIONS

Communication, EP Search Report for EP 01300722, dated Sep. 24, 2001.

Rosenthal, "Show and Tell the PC Way", Jul. 1994, recorded in Dialog File 256.

CES, "Computer Entry Systems—Planning & Information", an Annual Report of 1987, recorded in Dialog File 160—The Gale Group.

* cited by examiner

METHOD AND SYSTEM FOR TRACKING SCREEN ACTIVITIES

CROSS REFERENCE TO RELATED APPLICATION APPLICATIONS

This is a continuation of U.S. application Ser. No. 10/731,227, filed Dec. 8, 2003, now U.S. Pat. No. 7,299,281, which is a continuation of U.S. application Ser. No. 09/705,391, filed Nov. 2, 2000, now U.S. Pat. No. 6,662,226, which is a continuation-in-part of U.S. application Ser. No. 09/492,559, filed on Jan. 27, 2000, now abandoned, and U.S. application Ser. No. 09/644,404, filed Aug. 23, 2000, now abandoned.

BACKGROUND OF THE INVENTION

1. Field of the Invention

The present invention relates to interactions with terminal devices having a user interface to display information, and more particularly to a method and system for capturing, tracking, storing, augmenting and replaying the displayed information encountered during one or more interactive session, wherein the one or more interactive session involves a series of screen displays.

2. Description of the Related Art

Various information is accessed through wide area networks (WAN) such as the Internet. The content of these wide area networks is dynamic, information is always being added and deleted. Information available at one time may be unavailable at a later time because a user may not save it when it was available or its source may have been deleted, or it may be still available but the user is not quite sure of its location. In other cases, one desires to see how others proceed with interactions with provided information.

Computing devices enable users to interact with various information streams such as interaction with various web sites over the Internet. These interactions are typically achieved via hardware devices including a display device and a user interface (i.e., a keyboard and a pointing device). In order to instruct a computing system to perform a task, a user may type a command on a keyboard or make a selection from a menu or button bar using a pointing device (e.g., a mouse or touch pad). In response to the user's input, the computing system may display text on the display device, display an image or play a sound, all of which provides an indication to the users of the results of their interaction.

Selectively preserving some of these interactions is akin to transmitting the information associated with a particular interaction from the present to the future. There is therefore a need for information retention, source identification, and processing services associated with the transmitted information from designated terminal devices. Additionally, since this information must be stored for future access, there is also a need for information annotation (i.e., from where, for who and when).

SUMMARY OF THE INVENTION

An object of the present invention is to provide a method and system that facilitates an individual, enterprise or business entity to record, store, process and manage information associated with interactions transacted on designated terminal devices. More specifically, individual and sequenced display presentations are captured or recorded and supplemented with associated information such as input control sequences, time stamps, user specific identification information, processing instructions, source information and validation information which may take the form of alpha numeric sequences or machine readable entities either of which may be encrypted.

In an embodiment of the present invention, software agents (resident on a user's terminal device and/or a remotely accessible server devices) record the activities associated with a given interactive session where that interactive session comprises a series of screen displays and any associated user interface or network activity. The captured information is indexed, processed (i.e., sensitive information may be encrypted and the captured content may be compressed for efficient storage) and stored for future access (i.e., replay or playback) either on the initiating terminal device or a designated remote server device. Additionally, since source addressing information is retained with the captured information, future modifications to source files associated with the captured information may also be tracked either offline or upon request.

The present invention can be implemented in numerous forms. Different implementations of the present invention yield one or more of the following advantages. One advantage of the invention is that an effective digital tracking system is provided to track device interactions (i.e., screen activity over a period of time and associated input and network interactions) associated with user interactions with various information streams accessible through a network such as the Internet or an Intranet. This capturing process may be activated automatically or may be initiated by the user as desired. Another advantage of the present invention is that the captured information can be processed (i.e., encryption, compression) augmented by time stamps, user specific information (i.e., electronic signatures) and validation information which may take the form of alpha-numeric character strings or machine readable entities which may be encrypted. Still another advantage of the present invention is the captured information may be stored and managed on initiating terminal device and/or remotely on a designated server device for future reference.

The foregoing and other objects, features and advantages of the invention will become more apparent from the following detailed description of a preferred embodiment, which proceeds with reference to the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
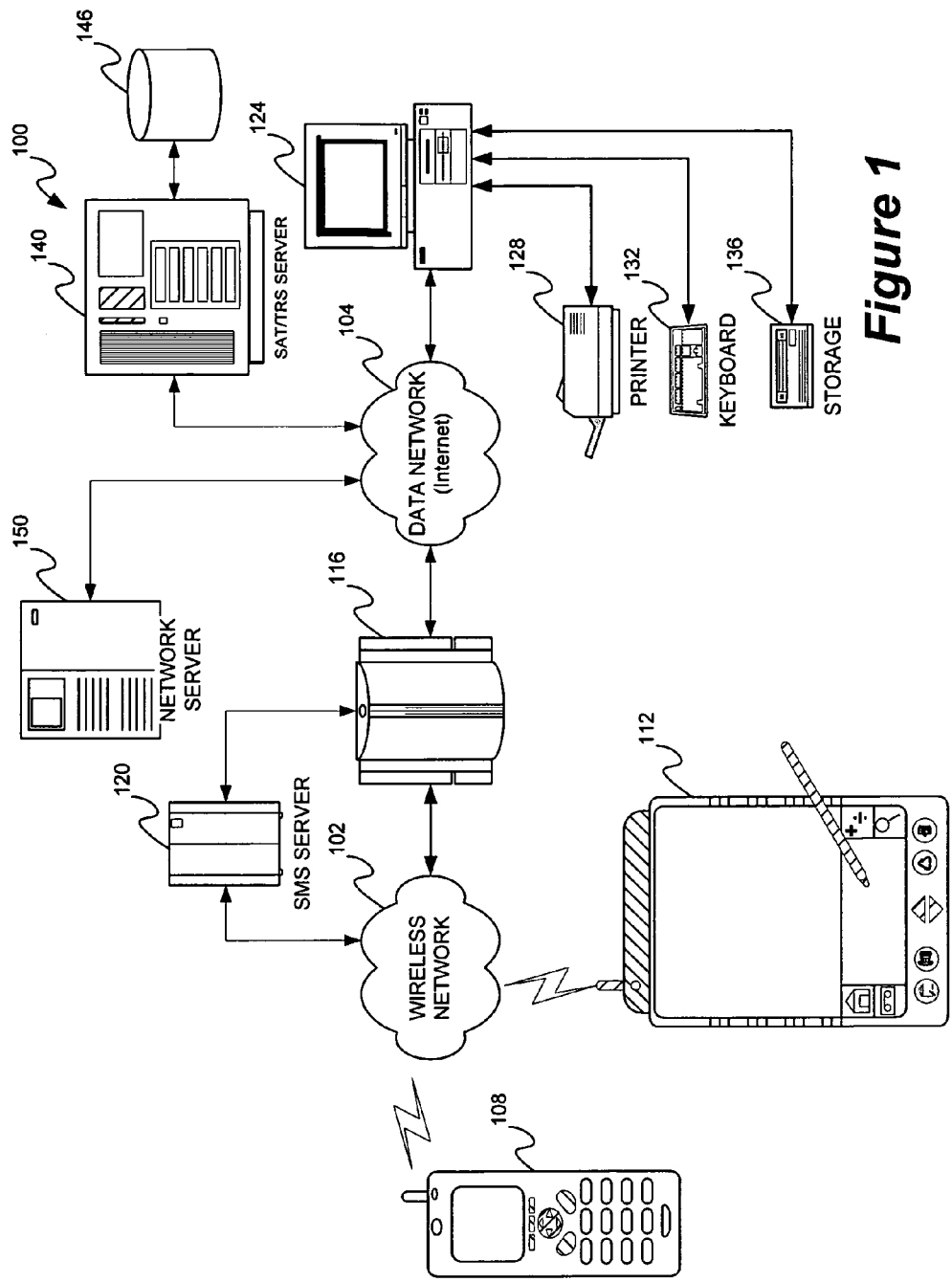
FIG. 1 is a block diagram of a networked communication system which may be used to implement the method and system embodying the invention.

The invention pertains to a method and a system for capturing, processing and replaying a series of screen displays associated with one or more transactions. As used herein, a transaction means data exchange between two devices. For example, a transaction occurs when a provider accepts an order of certain items from a buyer. Likewise a transaction is deemed to occur when pertinent data/information entered/ provided by one side is released to the other side. In general a transaction means a sequence of information exchange and related work (such as database updating) that is treated as a unit for the purposes of satisfying a request and for ensuring database integrity. For a transaction to be completed and database changes to occur, a transaction has to be completed in its entirety. One of the common transactions over the Internet is a catalog merchandise order by a customer. When the order is received on the server side, the order transaction involves checking an inventory database, confirming that the item is available, placing the order, and confirming that the order has been placed and the expected time of shipment. If the order is deemed as a single transaction, then all of the steps must be completed and validated before the transaction is successful and the database is actually changed to reflect the new order.

Generally, a transaction is supported by one or more screen displays so that a user can interact with the displays to conduct the transaction. One of the key features in the present invention is to capture such displays including user's interaction. Another feature is to provide a mechanism to store and manage the captured displays. Still another feature is to playback the stored displays so that review of the displays reveals how a user interacts with his/her terminal to proceed with a transaction. In one embodiment, the stored information as a series of captured screen interactive information (i.e., screen displays and user inputs) can be augmented with validation information and played back in a predefined order upon request.

Terminal devices, also referred to as computing devices herein, include but are not limited to personal computers, laptop computers, computer terminals, personal digital assistants, palm-sized computing devices, cellular phones, two-way pagers and computer work stations. Such devices typically have a user interface comprised of a display, a keyboard/ keypad and a pointing device (e.g., a mouse, a trackball, a joystick, a navigation key-set or a touch-pad).

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Referring now to the drawings, in which like numerals refer to like parts throughout the several views. FIG. 1 shows a basic system configuration in which the present invention may be implemented in accordance with a preferred embodiment. Communications system 100 generally includes a plurality of communications networks such as wireless network 102 with an associated SMS channel and data network 104 (i.e., the Internet or a private intranet). These communications networks support communications between a plurality of diverse terminal devices, such as is illustrated by wireless communication device 108 (i.e., a cell phone), personal digital assistant (PDA) 112, personal computer 124 and a plurality of network servers represented by network server 150.

According to one embodiment of the present invention, services associated with the capture and storage of a terminal device activities are processed by software modules resident on the initiating terminal device (i.e., PDA 112) or on remote server devices such as Transaction Recording System (TRS) Server 140. These software modules provide services relating to the acquisition, processing (i.e., compression and encryption), validation and management of screen display content (i.e., a series of screen displays), input commands, device status information, user specific information, source specific information, network information, resource utilization (i.e., printers and external storage devices), time stamps and in general any information associated with the user's interaction with the terminal device. Additionally, the software modules provide services related to the management and utilization of local and remote user specific storage areas.

The communication system illustrated in FIG. 1 is provided for purposes of illustration and not limitation. It would be understood by one of ordinary skill in the art that the present invention may be practiced in a communications system having configurations and system components that differ from those described above.

According to one aspect of the present invention, a user interacting with a terminal device (i.e., PDA 112), via an associated user interface (i.e., a touch screen and associated display), may initiate the capture process to capture a series of displays on a screen through a pre-defined user interface interaction (i.e., a soft key on PDA 112). Upon process initiation, software modules resident on the terminal device or embedded as an applet or an application cause a series of screen displays and associated device and network interactive event indications to be captured. The captured images and event indications may be supplemented with validation information (i.e., a time stamp, a user specific electronic signature and validation information which may take the form of alpha numeric character strings or machine readable marks) and then processed for storage and future display. The archived event information may be stored locally and/or on a designated remote server device for future reference.

It is defined without the loss of generality that an interaction involves activities (i.e., display content, user input/output in response to what is being displayed in the subject terminal device) performed by a user with respect to the user interface of a terminal device that may or may not be networked. Some key advantages of the present invention include the ability to archive device interactions, validate those interactions (i.e., an encrypted alpha numeric character string which encodes a portion of the archived content) and associate the archived information with attribute information such as electronic signatures or time stamps.

Figure 2:
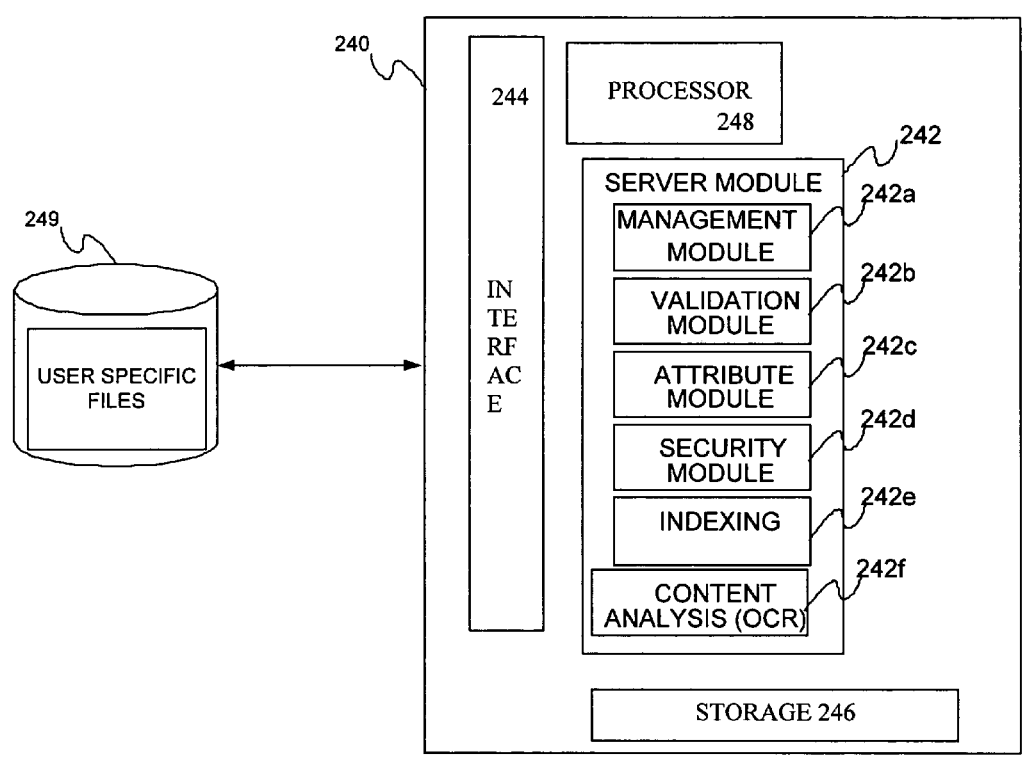
FIG. 2 shows a functional diagram of a TSR (Transaction Recording System) Server which may be used in conjunction with the implementation of an embodiment of the present invention.
Figure 3A:
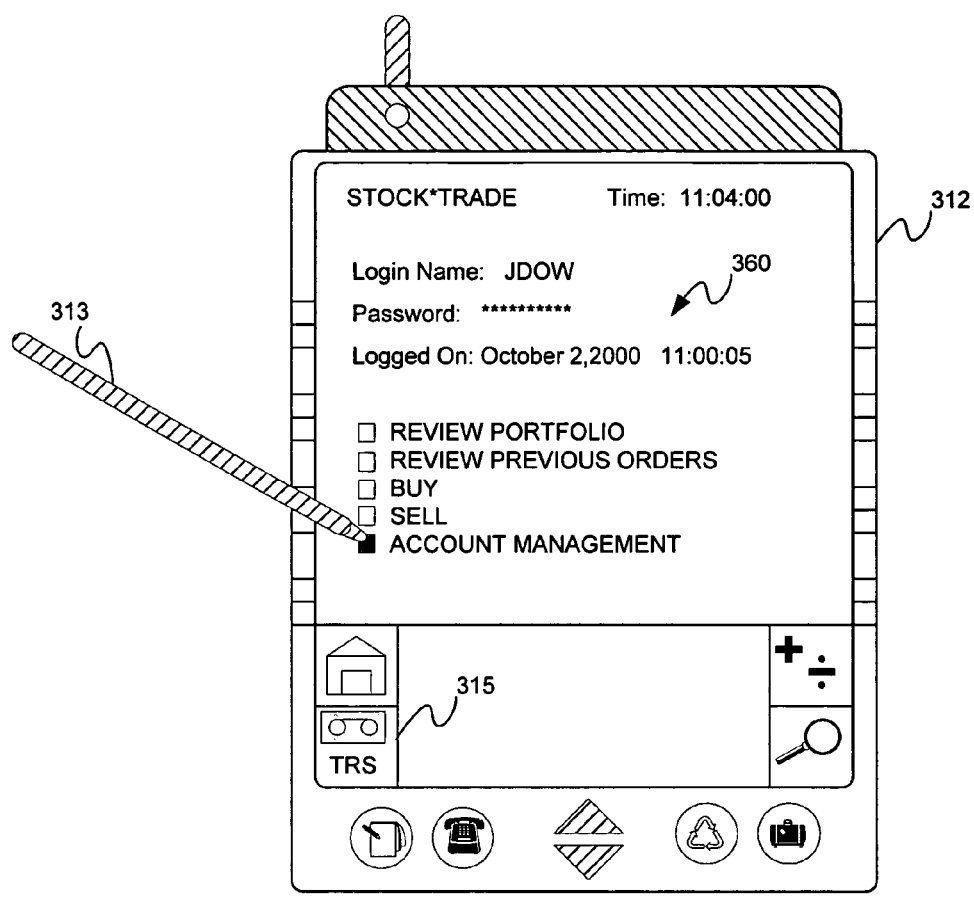
FIGS. 3A to 3G illustrate representative screen displays which may be captured, validated and processed in accordance with an embodiment of the present invention.
Figure 3B:
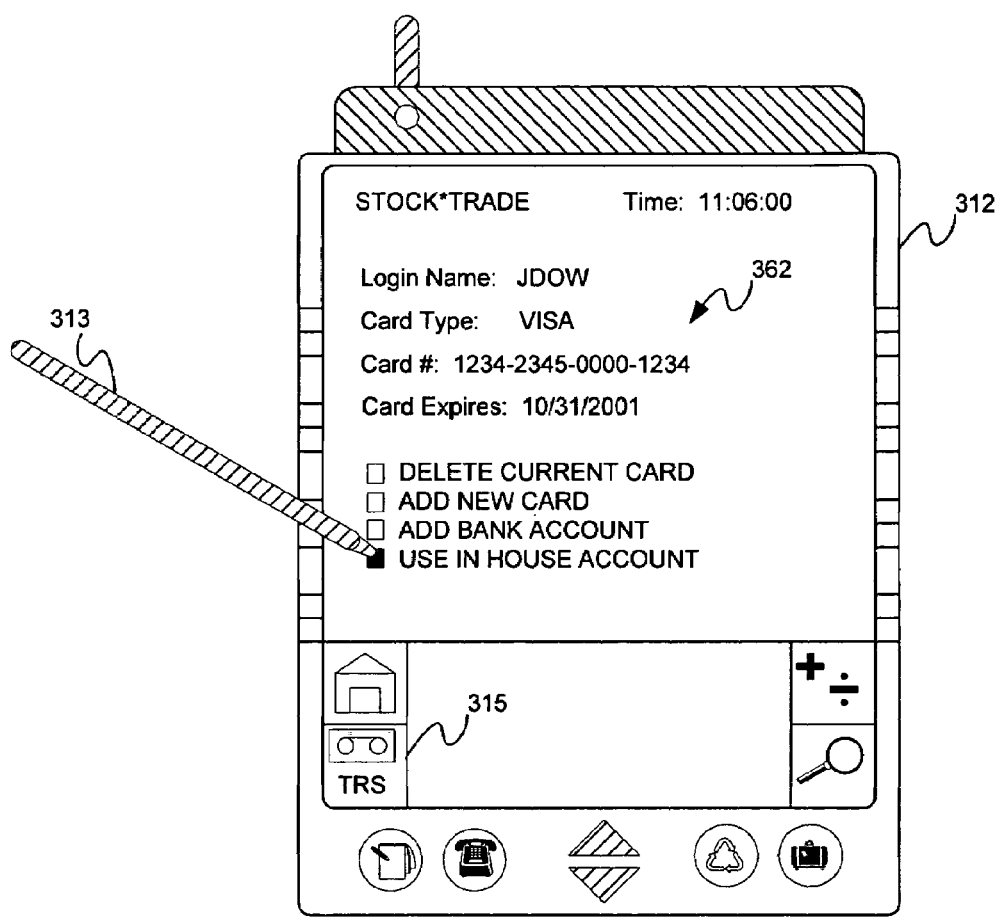
Figure 3C:
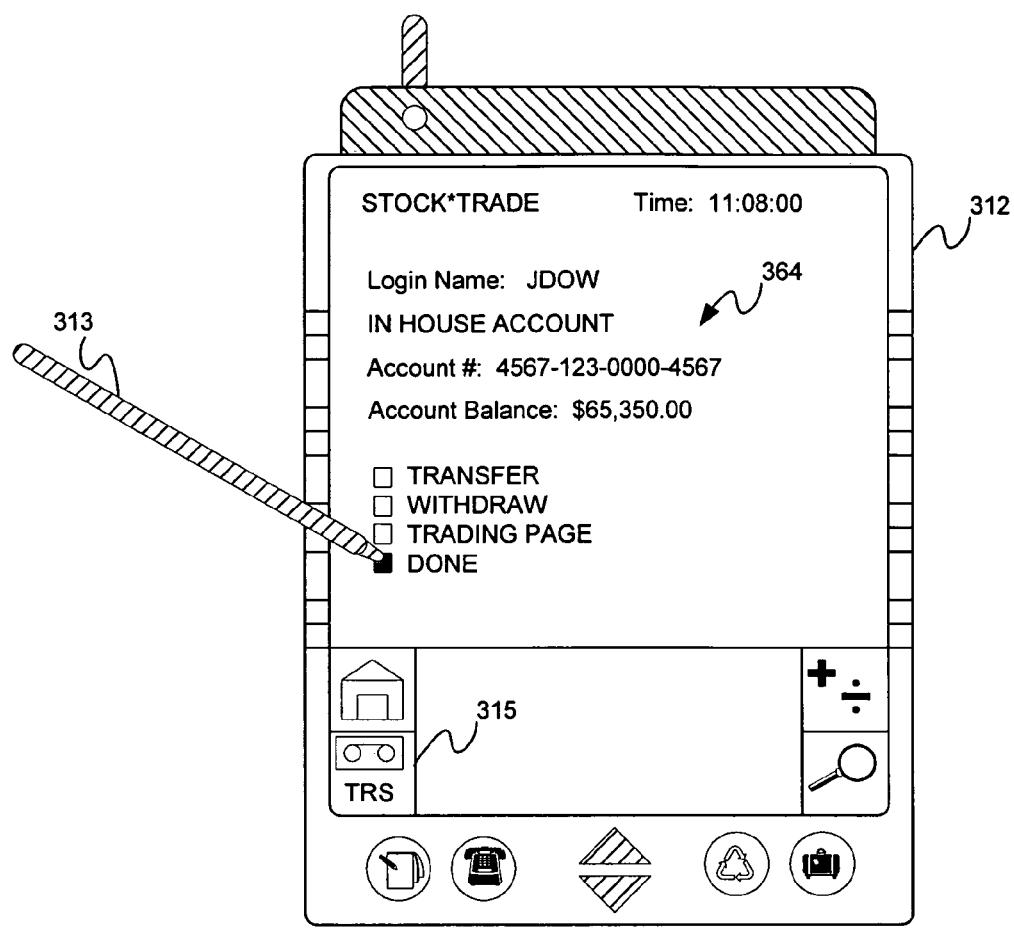
Figure 3D:
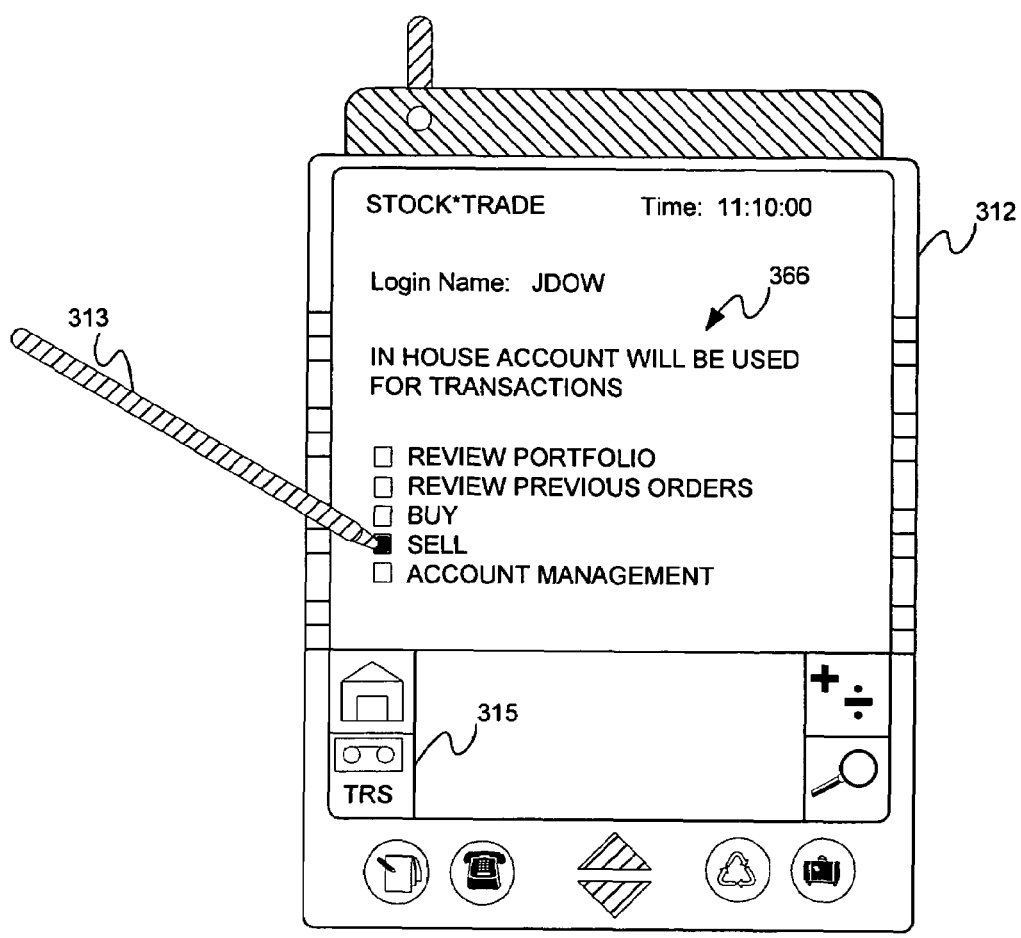
Figure 3E:
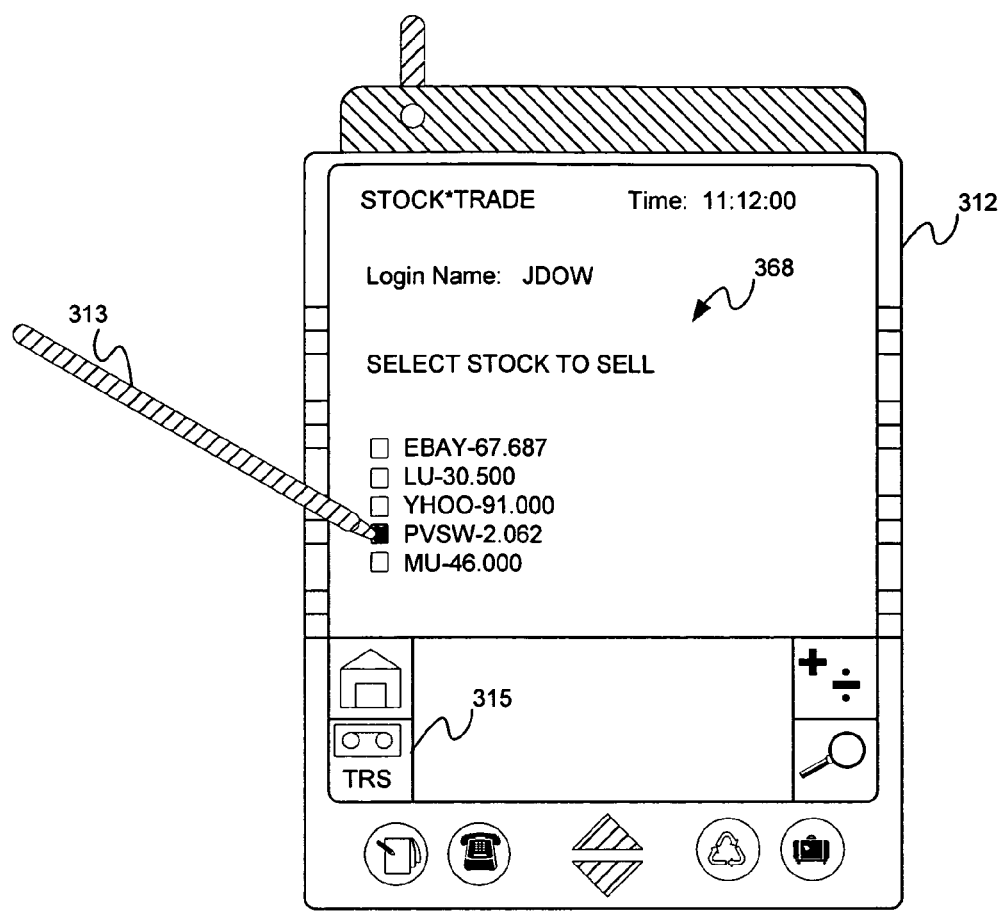
Figure 3F:
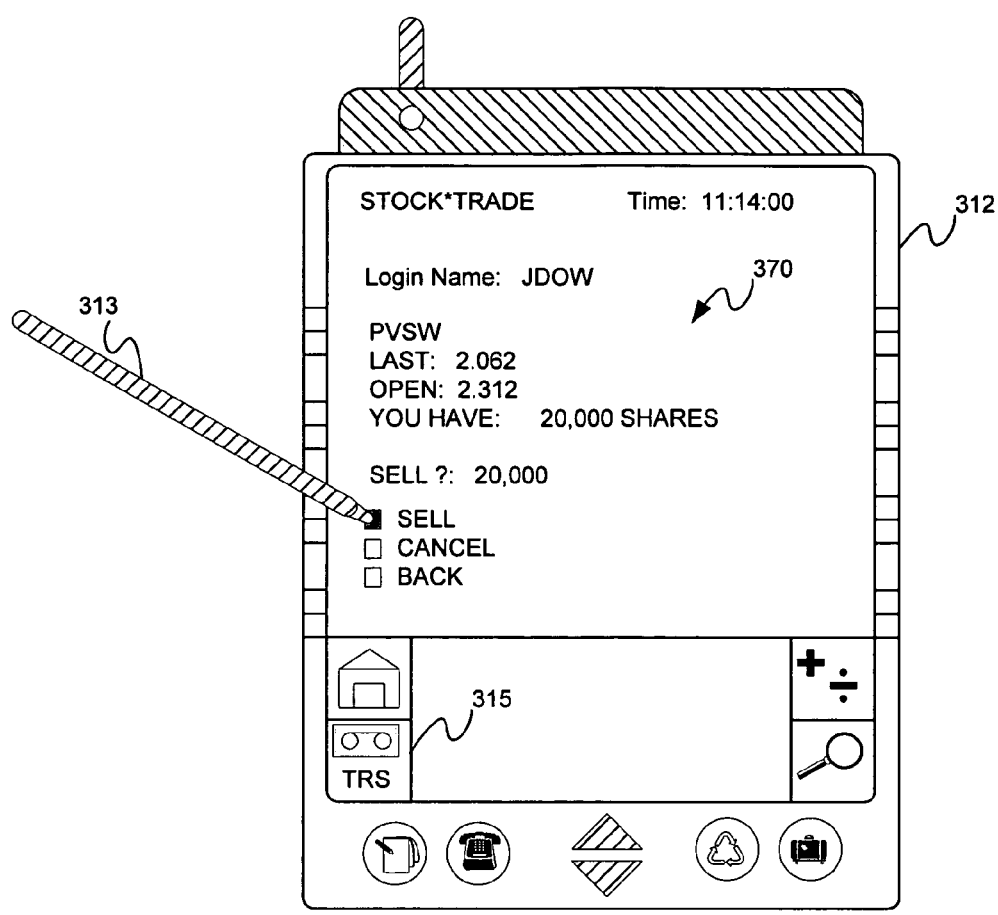
Figure 3G:
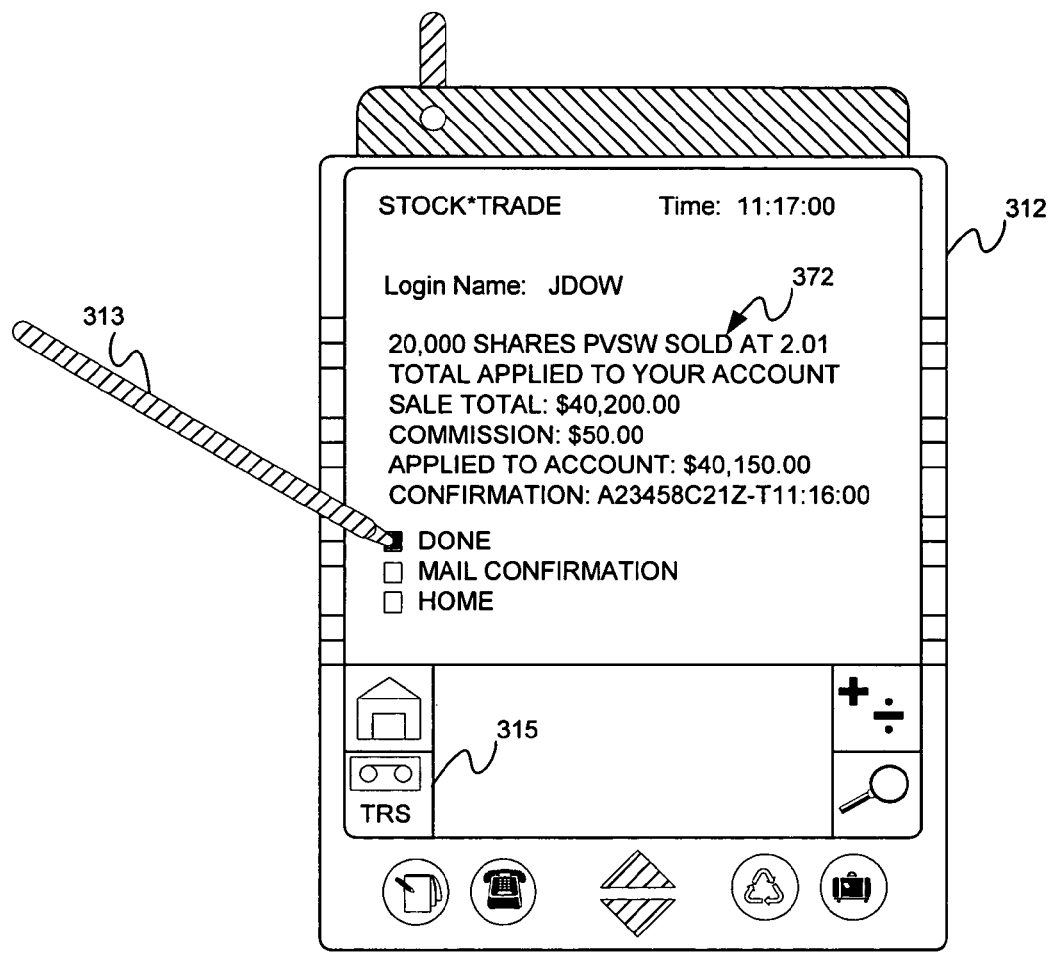

Referring now to FIG. 2, there is shown a functional block diagram of a TRS server 240 that may correspond to TRS server 140 of FIG. 1. A network interface 242 in TRS server 240 facilitates a data flow between a data network (i.e., data network 104 of FIG. 1) and TRS server 240 and typically executes a special set of rules (a protocol) for the end points in a link to send data back and forth. One of the common protocols is TCP/IP (Transmission Control Protocol/Internet Protocol) commonly used in the Internet. The network interface manages the assembling of a message or file into smaller packets that are transmitted over the associated data network and reassembles received packets into the original message or file. In addition, TRS server 240 handles the address part of each packet so that it gets to the right destination.

TRS server 240 comprises a processor (or multi-processor) 248, a server module 242 and a storage space 246. In practice, any computing device having reasonable computing resources (i.e., processing power and memory capacity) may be utilized as an TRS server. Storage space 246 may be resident within TRS server 240 or in a separate accessible server device (not shown). Part of the storage space 246 is allocated to retain captured information from the client devices and accessible upon request. It should be noted the storage space 246 may be a single storage device or a cluster of storage devices located locally and/or remotely (e.g. storage space 249 is connected through a network). In one embodiment, the captured information may be respectively associated with a particular user, type information of the client device, billing information, electronic signatures, device information etc.

According to one embodiment of the present invention, server module 242 is a compiled and linked version of a computer language implementing the present embodiment and loaded in a memory. When executed by TRS server 240 (i.e. processor 248), server module 242 performs a number of functions to facilitate the operations associated with a preferred embodiment of the present invention.

Server module 242 comprises a management module 242a, validation module 242b, attribute module 242c, security module 242d, indexing module 242e and content analysis module 242f. Management module 242a provides account initialization, management and service functions for a plurality of user accounts associated with users having access to this service. In one embodiment, management module 242a is an interface selectively accessible by users and an administrator respectively. Typically, a user is permitted to retrieve the recording of his/her screen activities while an administrator is permitted to retrieve any one's recording.

Validation module 242b provides validation services that serve to generate evidence that the archived event information has not been modified. The evidence may take the form of alphanumeric character strings containing encoded or encrypted information associated with the archival information. For example, a portion of the archived event information may be incorporated into a machine-readable symbol or a certified copy may be accessed via a trusted third party server device. Attribute module 242c associates additional information (i.e., time stamps, electronic signatures, position information, etc.) with the archived event information. Security module 242d protects the archived information from unauthorized access. Indexing/Routing module 242e provides services relating to cataloging and providing an index of available event files. Content analysis module 242f is used to analyze what is in the captured events (i.e. screens). In one embodiment, content analysis module 242f employs an OCR engine to perform optical character recognition of one or more selected pages of the captured events. Together with indexing module 242e, content analysis module 242f may help automatic indexing of the captured events. It is clear to those skilled in the art that not every element in the module 242 needs to be implemented to achieve the desired results contemplated by the present invention.

FIGS. 3A to 3G illustrate a series of representative screen displays that may be captured, validated and processed in accordance with an embodiment of the present invention. The screen displays may be displayed on a display screen of a computing device, such as a personal laptop/desktop computer and a personal data assistant (PDA).

As used herein, a display screen or a screen is the physical display apparatus in a computing device, such as a 15 inch CRT or LCD screen commonly seen with a computing device. A screen display, a displayed page, a displayed window or simply a display is an image presented on the display screen. For example, a file that constitutes a display may be an HTML file, wherein HTML stands for HyperText Markup Language, an image thereof appears on a display screen when the file is read or executed by a display application.

To understand the representative screen displays in FIGS. 3A to 3G, a PDA is used as one of the exemplary computing devices. PDA 312 may correspond to PDA 112 of FIG. 1 and includes a user interface comprised of a display/touch screen, a navigation key-set, application keys and softkeys which may be used to interact with the PDA 312. In accordance with an embodiment of the present invention, the TRS archiving can be initiated through a TRS program key 315, a touch of a designated area on a screen display, an entry of a predefined word or web address.

In one embodiment, the TRS archiving is initiated when a user logs onto a particular screen display, such as an initial page of a personal account. Once TRS archiving is initialized, user interactions with PDA 312 (i.e. screen content, user inputs, URI's, and associated cached information) for the series of screen displays illustrated in FIGS. 3A to 3G are sequentially captured.

Each of the screen display is captured by a screen capturing process that may be an application or a Java applet embedded in a display. In one embodiment, the screen capturing process is implemented by utilizing calls provided in Microsoft Foundation Class (MFC) supported in MS Windows OS. An example of such implementation is provided as follows:

```
BOOL CaptureCurrentScrollArea(int nHeight)
{
// create a XImage object
// XImage is a predefined class and contains image
// attributes and device dependent bitmap object.
XImage* pImage=new XImage;
// assign the image attributes.
// x_IWidth is the image width being captured.
// nHeight is the height for the scroll area.
// g_uSysBitCount is system graphics bit/pixel setting.
pImage->x_IWidth=x_Iwidth;
pImage->x_IHeight=nHeight;
pImage->x_wBitsPixel=g_uSysBitCount;
// create screen DC
// this DC will be used to copy bitmap from the scroll area
CDC dcScr;
dcScr.CreateDC("DISPLAY", NULL, NULL, NULL);
// create a device dependent bitmap object.
if (!pImage->bitmap.CreateCompatibleBitmap
    (&dcScr, pImage->x_IWidth, pImage->x_IHeight))
    return FALSE; // the capture is not successful.
// an empty bitmap is created.//
// now create a compatible memory DC.
```

```
CDC dcMem;
BOOL bCreateDC=
    dcMem.CreateCompatibleDC(&dcScr);
CBitmap* pOldBmp=
    dcMem.SelectObject(&pImage->bitmap);
// ready to copy the bitmap from the scroll area.
// BitBlt is the critical function call to do the job.
// g_rcCapture is the global variable that contains the
// coordinates of the current window being captured.
dcMem.BitBlt(0,
    0,
    pImage->x_lWidth,
    pImage->x_lHeight,
    &dcScr,
    g_rcCapture.left,
    g_rcCapture.bottom - nHeight,
    SRCCOPY);
dcMem.SelectObject(pOldBmp);
// the job is done.
// the XImage object contains the captured bitmap of
// the scroll area.
// store the captured image in a local file.
if (!SaveBitmapToTempFile(pImage))
    return FALSE; // the capture is not successful.
// calculate the total height of the complete image
g_nTotalHeight +=nHeight;
// the saved image file will be used in the image
// concatenation when we stitch individule pieces
// of the document image back into its entirety.
return TRUE; // the capture is successful.
}
``` wherein g_rcCapture is the global variable that contains the coordinates of the active window being captured. The only parameter passed by calling module is the height of the display window that can be readily determined.

Once the displays in FIGS. 3A to 3G are captured, the displays or contents therein may be supplemented with attributes such as a time stamp to indicate when the displays or contents are captured. The displays or contents therein may be also processed such that the displays selective or content elements can receive special treatment (e.g. encrypted) and afterwards be compressed using a compression process. In a preferable embodiment, the displays or processed versions thereof are uploaded to a remote server through a network (e.g. a LAN, a wireless network, or the Internet).

Figure 4:
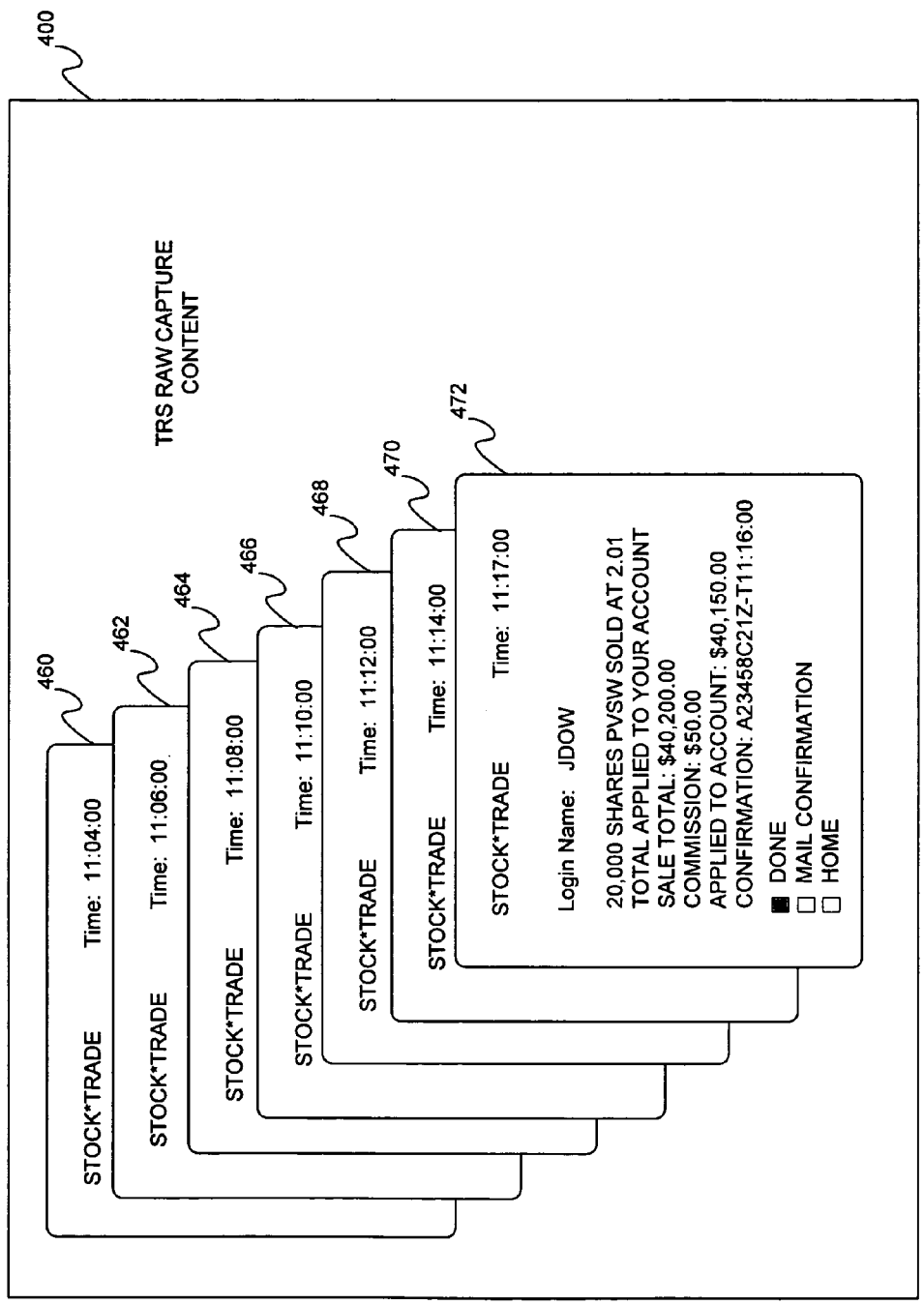
FIG. 4 illustrates a representative series of screen displays which may be captured in accordance with an embodiment of the present invention.

FIG. 4 illustrates a representative series of screen displays that have been captured in accordance with screen displays shown in FIGS. 3A to 3G. Validation information for the series of screen displays may be associated with each individual screen display or may be grouped into a single validation entity that represents the group as a whole. Additionally, there may be separate validation entries for each of the individual screen displays and the series of screen displays as a whole. As shown in FIG. 4, each of the captured displays has been respectively attributed with a time stamp to indicate when the display is captured at the terminal device or arrived at the server.

Figure 5:
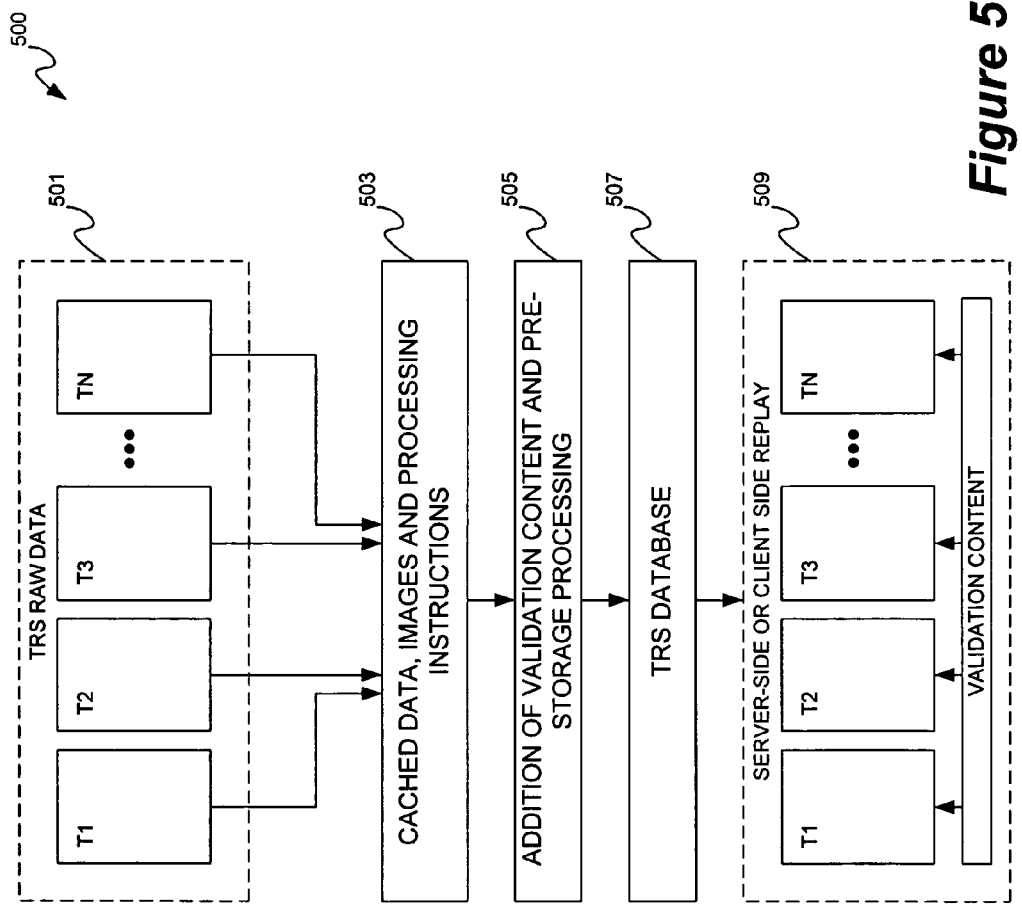
FIG. 5 is a flow diagram of the process associated with processing (i.e., encryption, validation and compression) a series of captured screen displays in accordance with an embodiment of the present invention.

FIG. 5 is a functional diagram of a process associated with processing (i.e., encryption, validation and compression) a series of captured screen displays 501 in accordance with an embodiment of the present invention. Each of screen displays 501 is initially cached at 501 and may be processed (e.g. texts are recognized by an OCR process) or parsed so that content elements requiring special treatment may be proceeded. For example, some of the content elements contains classification tags (i.e., "classified" and "unclassified") then those elements (i.e., credit card numbers, account numbers etc.) can be singled out for special treatment such as encryption. At 505 validation data such as time stamps or electronic signatures are added and the screen displays (including the attributed ones) may then be compressed. The processed file is stored in a TRS database at 507 that may be resident on the subject terminal device or a remote server device. Upon request, the stored file can be retrieved and replayed at 509. In one application, a viewer can assess what transactions a user (i.e. a person who interacts with the terminal device) has entered and how the user was reacted to the transactions. The assessment may potentially provide useful marketing feedback.

Figure 6A:
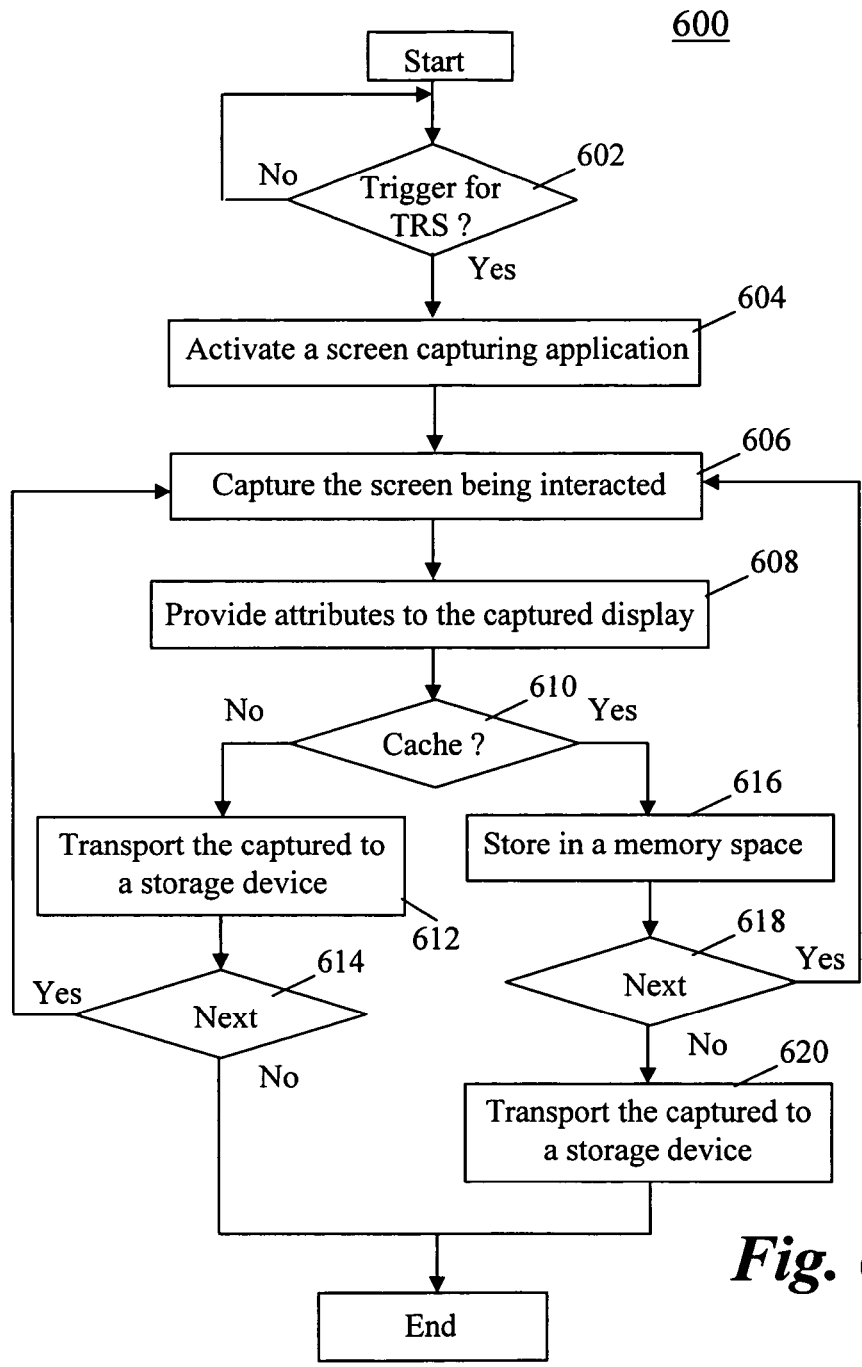
FIG. 6A is a process of a terminal device being interacted with a user.

FIG. 6A shows a process 600 of a terminal device being interacted with a user. Generally, the terminal device is coupled to a server and provides a mechanism to the user to perform certain functions. For example, the server is a brokerage (e.g. www.schwab.com) from which the user can trade stocks during business hours or the server is an internal data center with which the user can exchange data through the terminal device. After the user logins onto the server and navigates to a page or display that may be the initial display for a transaction. According to one embodiment, when the initial display embedded with a flag or a signal that can trigger the TRS process comes in at 602, a screen capturing application is activated at 604. As described above, the screen capturing application may be preinstalled in the terminal device or downloaded with or embedded in the initial display.

As the user interacts with the initial display or proceeds with subsequent displays, the displays are automatically captured by the screen capturing application at 606. The user's interactions with the terminal device may include an entry of data, one or more words/phrases, a click of a designated area in the display. As an option at 608, the captured displays may be attributed with one or more notions that include a timestamp, the user's identity information or device information of the terminal device.

At 610, it is determined if the respectively captured displays are to be cached. Depending on an exact implementation, each of the captured displays is respectively transported to a storage device at 612, hence there is no need for caching a captured display. The storage device may be a server located separately with respect to the terminal device and coupled thereto through a data link under a session (e.g. opened for the transaction). Whenever a display is captured, the image thereof is transported to the storage device. At 614, the process 600 goes to 606 to capture another display till no more displays need to be captured, which can be indicated within a last display to inactivate the screen capturing application. When no more displays need to be captured, the process 600 ends.

Depending on another implementation that required that all captured displayed are transported together to the server, then a captured display is to be cached at 610, and the captured display is stored in a memory space 616. At 618, the process 600 may go to 606 to capture another display till no more displays need to be captured, which can be indicated within a last display to inactivate the screen capturing application. At 620, the captured displays are then transported to the server and the process 600 end.

It should be noted that an optional procedure may be provided just before 612 or 620 to process the captured display(s). In one embodiment, the captured displays in image format can be compressed using a commonly known image compression technique such as JPEG. In another embodiment, the captured images are compressed using a commonly known image compression technique such as MPEG or other compression to take the advantage of similarity between two immediate displays. The purpose is to reduce the data size so that the transportation of the captured displays to the server is more efficient over the data line. In any event, the captured image or images, regardless processed or not, are referred to as a file that may be resident locally or being transported to the server.

Figure 6B:
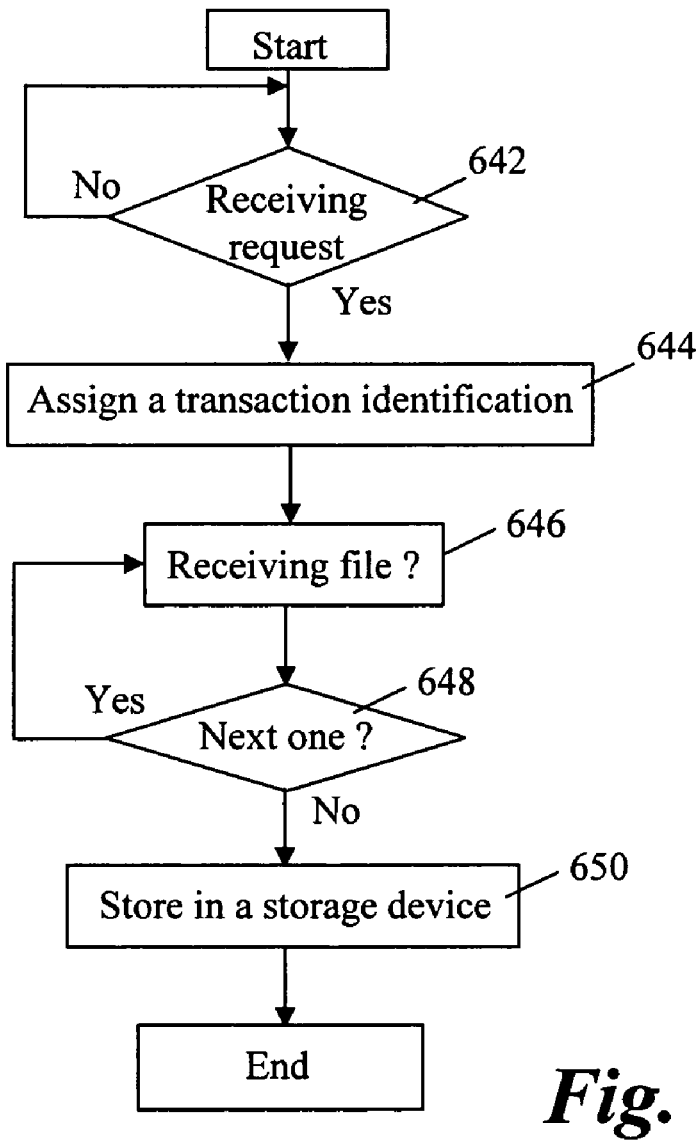
FIG. 6B is a process of a server communicating with the terminal device in FIG. 6A.

FIG. 6B shows a process 640 of a server communicating with the terminal device as discussed in FIG. 6A. At 642, the server awaits a request if any file is upcoming from a terminal device such as the one in FIG. 6A. When a request is received, the server assigns an identification to the file so that a query can be made later to retrieve the file when there is a need to review the file. Depending on an exact implementation or application, the identification may be a session ID, a transaction ID or any ID that can uniquely identify the file. At 646, the file is received. At 648, it is determined if there is another file related to the arrived file. As described above, sometimes, there are multiple files each comes individually for one transaction and sometime there is only one compounded file. If it is determined that there are no more files, the arrived files are then kept in a storage space at 650 for future retrieval.

Figure 6C:
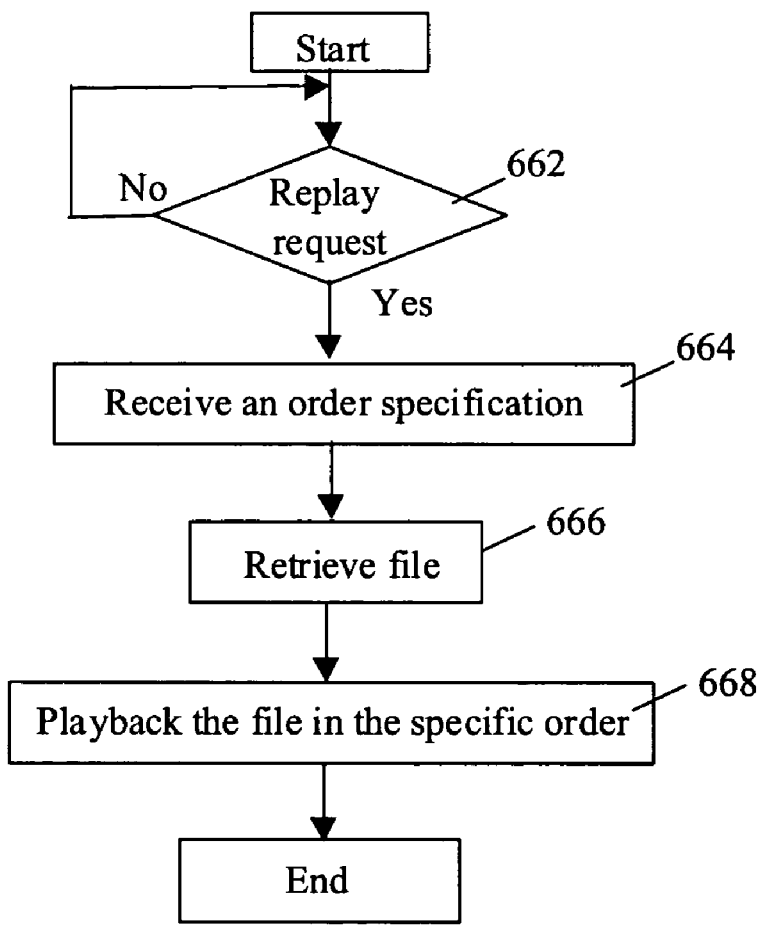
FIG. 6C shows a process of retrieving the archived file at a terminal associated with the server of FIG. 6B.

FIG. 6C shows a flow process 660 of retrieving the archived file at a terminal associated with the server. At 662, the process 660 awaits a retrieval or replay request that may come from a terminal operated by an operator. The request may include parameters related to a transaction ID or user identifier information so that a correct file may be located. For example, a business desires to review a user's behavior with respect to its web site, the process 600 can be used to view how the user interacts with the web site. A request may include a query of the user's ID. When the replay request is received, the process 660 is preferably instructed how to play back the archived file, namely in a specified order. At 666, the process 660 proceeds to look up for the file. At 668, the file is played back and displayed on a screen for review.

The invention may be implemented as a method, a system or code on a computer readable medium (i.e. a substrate). The computer readable medium is a data storage device that can store data, which can thereafter, be read by a computer system. Examples of a computer readable medium include read-only memory, random-access memory, CD-ROMs, magnetic tape, optical data storage devices and carrier waves. The computer readable medium can be distributed over a network coupled computer system so that the computer readable code is stored and executed in a distributed fashion.

The advantages of the invention are numerous. Different embodiments or implementations may yield one or more of the following advantages. One advantage of the invention is that user's interactions with terminal devices can be archived in a form that could be hardly altered (e.g. an image of a screen display) and validated for future use. Another advantage of the invention is that supplemental information may be associated with the archived content (i.e., time stamps, electronic signatures, location information, subject, and indexing). Still another advantage of the invention is that the individual screen displays may be stored as a single file that can be played back to show how each of the screen displays is formed.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be considered to fall within the scope of the invention.

We claim:

1. A computerized system for storing a plurality of image files representative of respective screens of content displayed on a mobile electronic device, the system comprising:
    an interface for receiving a plurality of image files representative of respective screens of content displayed on a mobile electronic device, wherein the plurality of image files are captured in response to an interaction of a user with the mobile electronic device;
    a storage device for storing the plurality of image files;
    at least one processor configured to execute software modules;
    a content analysis module configured to perform optical character recognition on at least some of the image files to generate text data associated with respective ones of the image files, wherein the content analysis module is further configured to determine at least portions of the text data associated with the respective ones of the image files that include one or more tagged keywords or tagged keyword patterns indicative of sensitive content; and
    a security module configured to encrypt only the one or more unencrypted tagged keywords or tagged keyword patterns included in the generated text data.

2. The computerized system of claim 1, wherein the keyword patterns include a financial account number pattern.

3. The computerized system of claim 2, wherein the keyword patterns include a credit card account number pattern.

4. The computerized system of claim 1, wherein the mobile electronic device comprises one or more of a cell phone, a personal digital assistant, and a personal computer.

5. The system of claim 1, wherein the security module is further configured to compress the generated text data, including the one or more encrypted tagged keywords or keyword patterns.

6. The system of claim 1, wherein the tagged keywords or tagged keyword patterns are tagged as "classified."

7. A computer-implemented method comprising:
    detecting user interactions with a computing device, wherein the computing device includes at least a display that selectively depicts content data, including one or more of graphical data or textual data, in response to at least one of the interactions;
    in response to detecting respective ones of the interactions, storing a respective graphical image in a computer readable medium, wherein the respective graphical image includes at least a portion of the content data depicted on the display at about the time of the respective one of the interactions;
    performing optical character recognition on at least some of the stored graphical image to generate respective text data;
    determining whether the generated text data includes one or more tagged keywords or tagged keyword patterns indicative of unencrypted sensitive content; and
    encrypting only the one or more unencrypted tagged keywords or tagged keyword patterns included in the generated text data.

8. The method of claim 7, wherein the tagged keyword patterns include keyword patterns associated with credit card numbers.

9. The method of claim 7, wherein the computing device comprises one or more of a personal computer, a laptop computer, a computer terminal, a personal digital assistant, a palm-sized computing device, a cellular phone, a two-way pager, or a computer work station.

10. The method of claim 7, further comprising compressing the generated text data, including the one or more encrypted tagged keywords or keyword patterns.

11. The method of claim 7, further comprising encrypting the entire generated text data in a subsequent process.

12. A computer readable medium storing software code thereon, the software code configured for execution by a computing device having one or more processors to cause the computing device to perform operations comprising:
- detecting user interactions with a computing device, wherein the computing device includes at least a display that selectively depicts content data, including one or more of graphical data or textual data, in response to at least one of the interactions;
- in response to detecting respective ones of the interactions, storing a respective graphical image in a computer readable medium, wherein the respective graphical image includes at least a portion of the content data depicted on the display at about the time of the respective one of the interactions;
- performing optical character recognition on at least some of the stored graphical image to generate respective text data;
- determining whether the generated text data includes one or more tagged keywords or tagged keyword patterns indicative of unencrypted sensitive content; and
- encrypting only the one or more tagged keywords or tagged keyword patterns included in the generated text data.

13. The computer readable medium of claim 12, wherein the one or more tagged keyword patterns comprise one or more of a financial account number pattern and a credit card account number pattern.

14. The computer readable medium of claim 12, wherein the operations further comprise encrypting the entire generated text data in a subsequent process.

15. The computer readable medium of claim 14, wherein the operations further comprise compressing the encrypted generated text data.

* * * * *

UNITED STATES PATENT AND TRADEMARK OFFICE
CERTIFICATE OF CORRECTION

| | | |
|---|---|---|
| PATENT NO. | : 7,904,596 B1 | |
| APPLICATION NO. | : 11/219289 | |
| DATED | : March 8, 2011 | |
| INVENTOR(S) | : Wang et al. | |

It is certified that error appears in the above-identified patent and that said Letters Patent is hereby corrected as shown below:

Column 1, line 5, delete "APPLICATION APPLICATIONS" and insert -- APPLICATIONS --.

Signed and Sealed this
Thirty-first Day of May, 2011

David J. Kappos
*Director of the United States Patent and Trademark Office*